United States Patent [19]

Gardiner

[11] 4,124,295

[45] Nov. 7, 1978

[54] BACKGROUND BRIGHTNESS CONTROL FOR DOCUMENT COPIER

[75] Inventor: Kenneth W. Gardiner, Menlo Park, Calif.

[73] Assignee: Savin Business Machines Corporation, Valhalla, N.Y.

[21] Appl. No.: 764,857

[22] Filed: Feb. 2, 1977

[51] Int. Cl.² .................... G03G 15/28; G03B 27/74

[52] U.S. Cl. .................................... 355/68; 355/8

[58] Field of Search .................. 355/75, 8, 11, 41, 77, 355/67-71, 83, 84, 35, 38

[56] References Cited

U.S. PATENT DOCUMENTS

| | | | |
|---|---|---|---|
| 1,934,484 | 11/1933 | Camilli | 355/68 X |
| 2,965,814 | 12/1960 | Gartner | 355/68 X |
| 3,279,312 | 10/1966 | Rogers | 355/68 X |
| 3,438,704 | 4/1969 | Schoen | 355/8 |
| 3,512,884 | 5/1970 | Murgas et al. | 355/84 X |
| 3,563,143 | 2/1971 | Petersen | 355/68 X |
| 3,609,038 | 9/1971 | Kolshorn | 355/68 |
| 3,728,023 | 4/1973 | Stevko et al. | 355/83 |
| 3,768,903 | 10/1973 | Steinberger et al. | 355/38 |
| 3,914,049 | 10/1975 | Basu et al. | 355/68 |

FOREIGN PATENT DOCUMENTS

| | | | |
|---|---|---|---|
| 1,413,313 | 11/1975 | United Kingdom | 355/75 |

*Primary Examiner*—Donald Griffin
*Attorney, Agent, or Firm*—Shenier & O'Connor

[57] ABSTRACT

An automatic background brightness control for document copiers of the type using automatic feeders for advancing original documents along a transport path to an imaging platen at which the documents are copied. As the feeder advances a document to the imaging platen, one or more light sources disposed at spaced locations across the transport path direct scanning beams onto the indicia-bearing side of the document. Photodetectors sense the light reflected from the scanned portions of the document to provide signals indicating the reflectance of the scanned portions. A signal-processing circuit responsive to the reflectance signals generates a background brightness control signal representing the maximum reflectance sensed by any of the detectors. The background brightness control signal regulates the intensity of the exposure lamp of the copier when the document reaches the imaging platen. In one alternative embodiment, the background brightness control signal regulates the width of an optical slit disposed adjacent to the photosensitive surface. In another alternative embodiment, the background brightness control signal regulates the effective aperture of the focusing lens.

24 Claims, 6 Drawing Figures

Fig 1
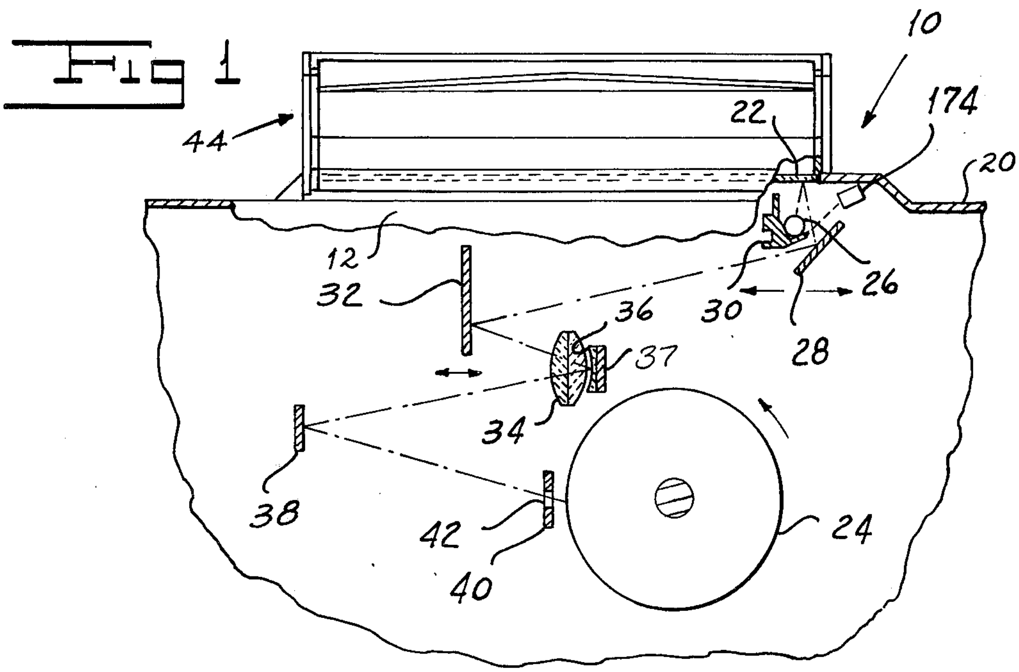
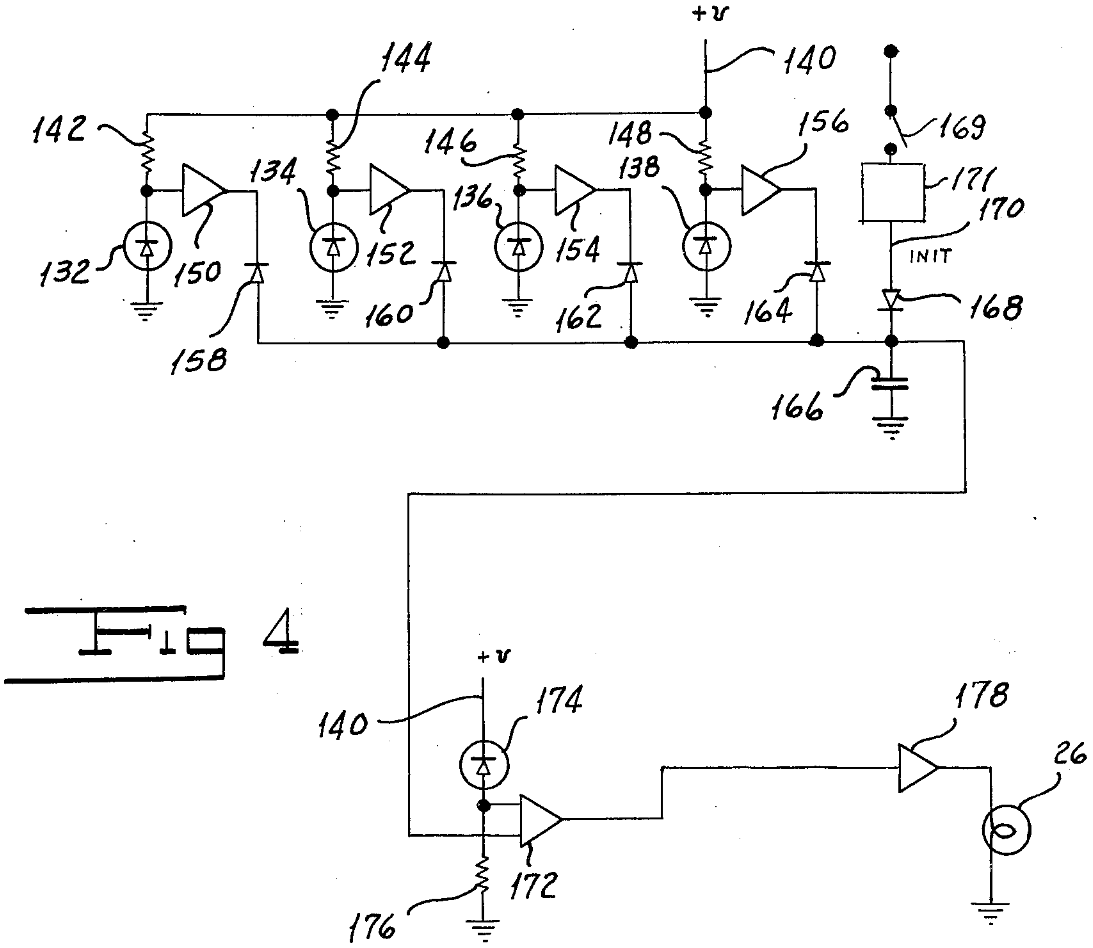
Fig 4

BACKGROUND BRIGHTNESS CONTROL FOR DOCUMENT COPIER

BACKGROUND OF THE INVENTION

My invention relates to apparatus for automatically controlling the background brightness of copies produced by a document copier and, more particularly, to apparatus to be used with an electrostatic copier in which a uniformly charged photoconductive surface is selectively discharged to form an electrostatic latent image of the original document.

It is generally desirable for electrostatic or other document copiers to produce copies having a white background, regardless of the background density of the original document. If all originals are simply given a fixed exposure sufficient to ensure a white copy background for originals having a relatively dark background, such as multicolored forms, then the contrast between printed areas and background areas in copies of originals having relatively light backgrounds will be unnecessarily lowered. Although many copiers are provided with a manual brightness control, such a facility at best allows a trial-and-error approach resulting in many wasted copies. Other copiers avoid the problem of brightness control by using development systems sensitive only to image contrast. While such systems are suitable for copiers handling only line material such as ordinary typed or printed matter, they are not suitable for copiers that must often handle continuous-tone originals or originals containing broad dark areas to be developed.

Several systems for automatically controlling copy brightness have been suggested. In one such system, described in U.S. Pat. No. 3,279,312 issued to Rogers, exposure is controlled by a signal provided by an optical detector disposed at a sensing station in advance of the imaging station. In another such system, described in U.S. Pat. No. 3,914,049 issued to Basu et al, an optical detector disposed in the optical path of the existing optical scanning system senses light from the original document during a prescan period in which the exposure lamp and optical scanning system are actuated. These systems, however, cannot readily distinguish between light and dark areas of documents to be copies and are thus subject to error.

SUMMARY OF THE INVENTION

One of the objects of my invention is to provide a background brightness control for a document copier which produces copies with a white background from originals of various reflectances.

Another object of my invention is to provide a background brightness control for a document copier which produces copies of optimum contrast from light originals.

Still another object of my invention is to provide a background brightness control for a document copier which operates automatically.

Still another object of my invention is to provide a background brightness control for a document copier which operates satisfactorily with originals containing continuous-tone material or large amounts of printed matter.

Other and further objects of my invention will appear from the following description.

In general, my invention contemplates a background brightness control comprising means for measuring the reflectance of a plurality of relatively small spot portions of the original document, means for computing the maximum reflectance measured by the measuring means, and means responsive to the computing means for regulating the brightness of the copy areas corresponding to the light areas of the original document. The measured spot portions should be small enough — about 1 millimeter or less in diameter for closely set printed matter — that at least one of the spot portions is likely to correspond to a background portion of the document. By measuring the reflectance of a plurality of relatively small spot portions of the document and computing the maximum measured reflectance to provide a control signal, I virtually ensure that at least one of the scanned spot portions represents only the background area of the document and that the control signal thus generated accurately reflects the background brightness of the document.

In another aspect, my invention contemplates a background brightness control comprising means for feeding the document along a predetermined path to the imaging station, means for measuring the reflectance of a portion of the document moving past the predetermined point, means for computing the maximum reflectance measured by the measuring means, and means responsive to the computing means for regulating the brightness of the copy areas corresponding to the light areas of the original document. Preferably, the portion scanned is a small spot such as described above. By controlling the copy brightness in accordance with the maxmimum reflectance of the document as measured before advancing it to the imaging station, I avoid the necessity of placing the optical system of the copier through a prescanning cycle, such as in the Basu et al patent. Further, I avoid the necessity for a specially constructed planten cover to reflect light onto the photosensitive surface but not the optical detector.

BRIEF DESCRIPTION OF THE DRAWINGS

In the accompanying drawings which form part of the instant specification and which are to be read in conjunction therewith and in which like reference numerals are used to indicate like parts in the various views:

FIG. 1 is a fragmentary front elevation of a document copier incorporating one embodiment of my background brightness control, with parts broken away and with other parts shown in section.

FIG. 3 is a fragmentary section of the document feeder shown in FIG. 2 taken along line 3—3 thereof.

DETAILED DESCRIPTION OF THE PREFERRED EMBODIMENTS

Figure 2:
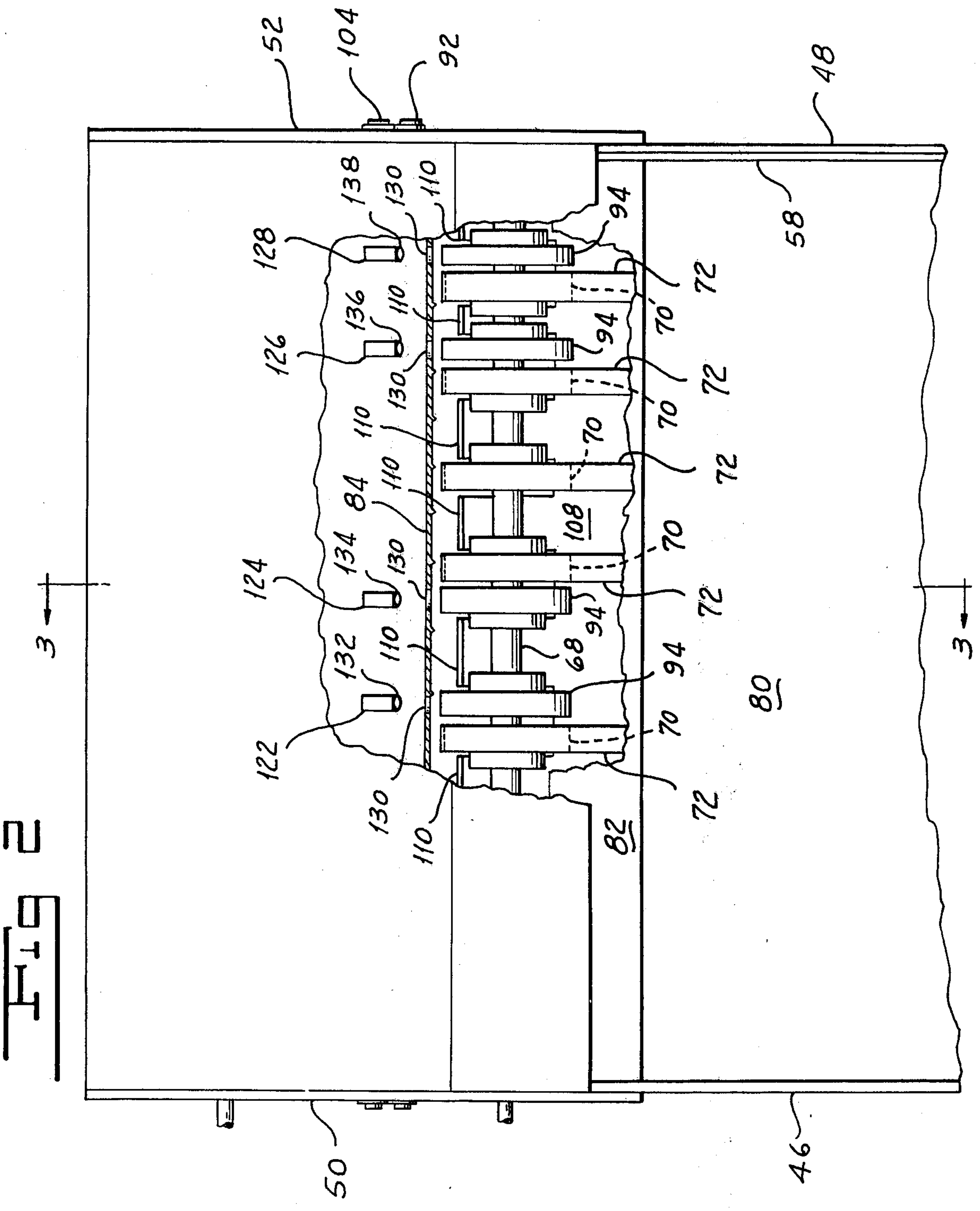
FIG. 2 is a fragmentary top plan of the document feeder used with the copier shown in FIG. 1, with parts broken away and with other parts shown in section, and housing the sensing portion of my control.

Referring now to FIGS. 1-4, my background brightness control is typically used in an electrostatic copier, indicated generally by the reference character 10, having front and rear panels 12 and 14, left and right side panels 16, and an upper wall 20. A raised portion of the upper wall 20 supports a transparent imaging platen 22. In use of the machine 10, an original to be copied is placed face down on the imaging platen 22.

An electrostatic latent image of the original is formed on the photoconductive imaging surface of a rotating cylindrical drum 24. Exposure is accomplished by scanning the original from right to left, as seen in FIG. 1, with an elongated exposure lamp 26 supported on a carriage 30 for movement across the underside of platen 22. An elongated parabolic reflector on carriage 30 focuses the light from lamp 26 on the face of the original being scanned. Reflected light from the original is directed by a first mirror 28 on carriage 30 toward a second mirror 32 which moves at half the speed of the first mirror 28 to keep the length of the light path from the original to the drum constant. The second mirror 32 directs the light through a convergent lens element 34 and divergent lens element 36 onto a backing mirror 37 behind the divergent element 36. Mirror 37 directs the light back through lens elements 34 and 36 onto a fixed mirror 38, which directs the light toward the drum surface. A plate 40 having an optical slit 42 elongated in the direction of the drum axis restricts the image field circumferentially to preserve image quality. Preferably, the plate 40 is formed from two pieces so that the slit width may be adjusted. A photodiode 174 supported on carriage 30 for movement therewith senses the intensity of the incident light from the lamp 26. Photodiode 174 forms part of the brightness control system described in greater detail below.

Referring particularly to FIGS. 2 and 3, a document feeder 44 disposed above the imaging platen 22 includes a left side panel 46 and a right side panel 48 extending generally along the machine platen 22. Left and right rear side panels 50 and 52 of the feeder frame are secured to the rear portions of the panels 46 and 48, respectively. Brackets 54 on the machine 10 carry pivot pins 56 extending into feeder frame rear side panels 50 and 52 to permit the entire feeder assembly to be swung away from the machine platen 22 to permit thick originals such as books to be copied. A sheet alignment guide 58 is fastened to the inner surface of the upper rear portion of panel 48.

The conveyor of the document feeder includes a front pulley assembly 60 comprising a shaft 62 rotatably supported between panels 46 and 48 and a plurality of pulleys 64 mounted on the shaft 62 at spaced locations therealong. A rear pulley assembly, indicated generally by reference character 66, includes a shaft 68 rotatably supported between panels 50 and 52 and a plurality of pulleys 70 mounted at spaced locations on the shaft 68. Individual drive belts 72 extend between respective pulleys 64 and 70 of the front and rear pulley assemblies 60 and 66 to form a conveyor loop. Preferably, the belts 72 are approximately ½ inch wide by 1/64 inch thick and are made of cloth-based neoprene or of cloth-based synthetic rubber sold by E. I. du Pont de Nemours & Co. under the trademark HYPALON. Flanged tensioning pulleys 74 rotatably mounted to the ends of resilient metal arms 76 provide belts 72 with a suitable amount of tension. The other ends of the arms 76 are secured to a support member 78 transversely mounted between side panels 46 and 48.

When a document such as a sheet of paper is to be copied, it is placed face up on a platform 80 supported between side panels 46 and 48. The document is then advanced manually along the platfrom 80 to an inlet A extending along the upper end of the rear pulley assembly 66. Preferably, the platform 80 is provided with a ramp 82 at its rear to give the document some rigidity as it enters the feeder through the inlet A. A cylindrical guide 84 directs the document around the pulley assembly 66 toward the imaging platen 22.

A plurality of fingers 86, shown in a retracted position in FIG. 3, are selectively movable through suitable slots (not shown) in the cylindrical guide 84 to block the movement of the document along the transport path and thus hold it in escrow until the copier 10 and the feeder 44 are ready to receive a document for copying. Fingers 86 are preferably stamped or otherwise formed from a single sheet of metal or other material so as to provide a mounting bracket 88 integral with the fingers. I secure bracket 88 to a metal block 90 carried by shaft 92 which is rotatably received by side panels 50 and 52 to permit pivotal movement of the fingers 86 across the document transport path.

A plurality of pressure rollers 96 with high-friction working surfaces 98 selectively engage respective low-friction drive rollers 94, mounted on the second pulley assembly shaft 68 between adjacent pulleys 70, to move a document around the transport path defined by cylindrical guide 84. Slots 105 formed in the cylindrical guide 84 permit engagement of the pairs of rollers 94 and 96. Pressure rollers 96 are mounted at spaced locations on a shaft 100 for rotation therewith. A plurality of pivot arms 102 mounted on a pivot shaft 104 receive shaft 100 to allow pressure roller 96 to be retracted from drive rollers 94.

Between copying cycles, pressure rollers 96 are disengaged from the drive rollers 94 while stop fingers 86 block the transport path. The operator manually inserts a document to be copied into the feeder 44 through the inlet A until its leading edge abuts the stop fingers 86. When the feeder is ready to accept a document for copying, fingers 86 are moved away from the transport path while pressure rollers 96 are simultaneously moved into engagement with drive rollers 94 to propel the document along the transport path. The actuating means for fingers 86 and pressure rollers 96 are described in detail in the copending application of Hori et al, Serial No. 624,860, filed Oct. 23, 1975, now U.S. Pat. No. 4,023,791.

Upon emerging from the lower end of the cylindrical guide 84, the document travels along a path over a rear edge plate 106 and the machine platen 22 and under a guide plate 108 mounted between side panels 46 and 48 in parallel, closely spaced relationship with the platen 22. A plurality of fingers 110 extending generally upwardly and rearwardly between the drive rollers 94 and pulleys 70 prevent the document from being fed over the guide plate 108. A plurality of respective front and rear pressure rollers 112 and 114 positioned opposite the inner belts 98 maintain the document in a close contacting relationship with the machine platen 22 as it advances across the platen's upper surface. Weights or the like (not shown) bias rollers 112 and 114 downwardly against the belts 72. Suitable slots (not shown) formed in guide plate 108 permit rollers 112 and 114 to contact the belts 72.

A gate 116 extending along the front edge of the platen 22 stops documents for copying. The gate 116, which is enclosed in a housing 118 mounted on the machine upper surface 18, comprises a plurality of upwardly extending fingers 120 normally biased upwardly between the belts 72 to prevent further movement of a document along the platen 22 but retractable downwardly away from the belts 72. The gate 116, which is more fully described in the Hori et al application, supra, may be actuated by any suitable means such as a solenoid (not shown).

The document is moved along the platen 22 by the transport belts 72 until the leading edge of the paper abuts the gate fingers 120 and further forward movement is prevented. The transport belts 72 then slip relative to the sheet of paper while providing a gentle force which aligns the leading edge of the document against the fingers if it has become skewed.

I mount a plurality of light sources 122, 124, 126, 128 in alignment with the respective drive rollers 94 behind guide 84 and on the other side of the document transport path from rollers 94. Light sources 122 to 128, which may be incandescent bulbs having tungsten filaments, direct scanning beams on the indicia-bearing side of the document as it moves from the stop fingers 86 toward the imaging platen 22. Slots 130 formed in the cylindrical guide 84 provide unobstructed paths for the light beams. Preferably, the scanning beams are relatively narrow, on the order of 1 millimeter in diameter at the paper surface, to ensure that the beams scan only the background of the document during at least a portion of the prescan period.

Figure 4:
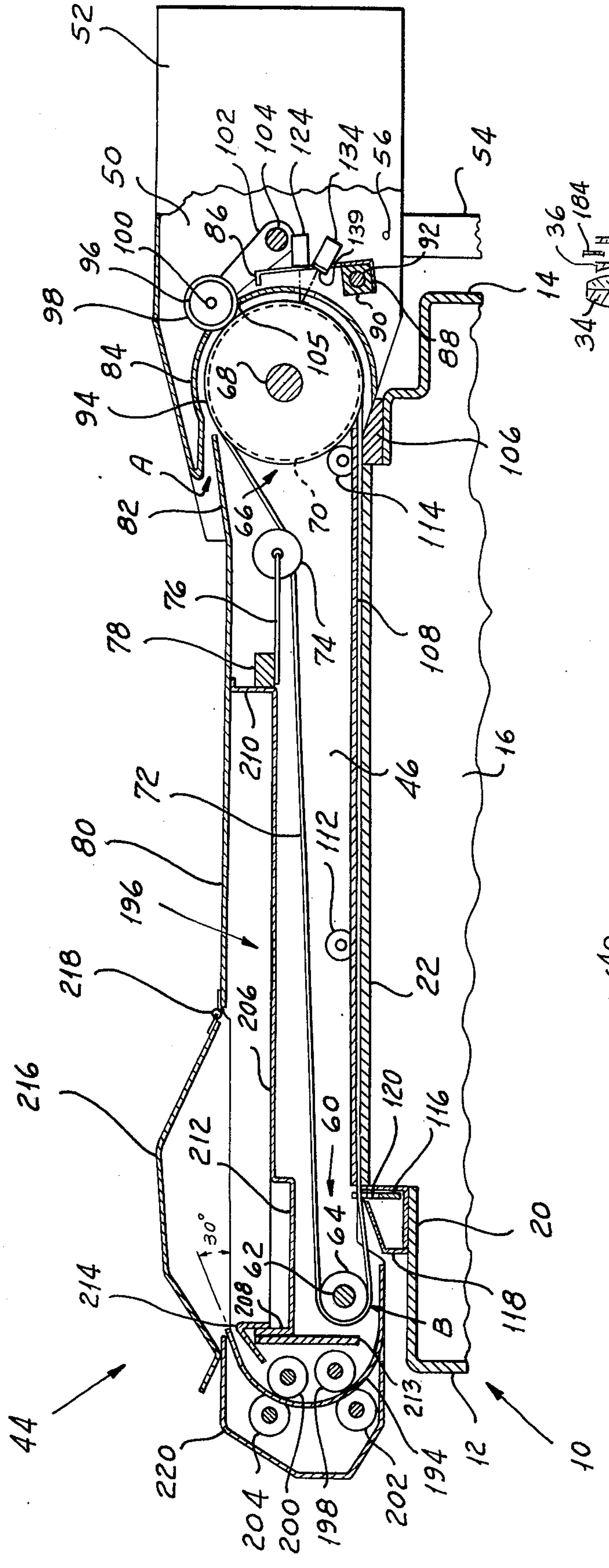
FIG. 4 is a schematic diagram of the electronic circuitry associated with my control.

Suitable photodetectors such as photodiodes 132, 134, 136, 138, arranged adjacent to respective light sources 122, 124, 126 and 128, sense the light reflected from the respective scanned portions of the document through the slots 130. Preferably, the overall spectral response of the light sources 122 to 128 and the photodiodes 132 to 138 matches that of the exposure lamp 26 and the photoconductive surface of the drum 24. This may be achieved by providing the photodiodes 132 to 138 with suitable optical filters 139. Each of the photodiodes 132 to 138 is connected between ground and one terminal of a respective resistor 142, 144, 146, or 148 (FIG. 4). The other terminals of resistors 142 to 148 are coupled to a line 140 connected to a suitable source of reverse-biasing potential.

Scanning at spaced locations across the document transport path ensures against false readings due to material having an atypical reflectance along a given scanning line. If only one light source and one photoconductor are used, they should be spaced from 2 to 3 inches from the plane of alignment defined by the guide 58 so that the line scanned does not include the letterhead or similar portion of the document. The light source and photodetector should not be spaced much further from the plane of alignment, however. Otherwise, small documents may be completely missed.

Each of the drive rollers 94 arranged opposite to one of the light sources 122 to 128 is suitably surfaced so as to be substantially less reflective than the darkest background area likely to be encountered. Photodiodes 132 to 138 thus remain substantially nonconductive when no document is present or when the beams scan dark areas of the document. Movement of a light or background document area into the path of a scanning beam causes the conductance of the corresponding diode to increase to a value proportional to the reflected light intensity. As a result, the voltage across the diode, which is approximately proportional to the resistance of the photodiode, drops to a level inversely related to the reflected light intensity.

Referring now to FIG. 4, a signal representing the maximum reflected light intensity is derived by coupling the ungrounded terminals of photodiodes 132, 134, 136, and 138 to the inputs of respective unity-gain buffer amplifiers 150, 152, 154, or 156, each of which has a relatively high input impedance and a low output impedance. The outputs of the amplifiers 150, 152, 154, and 156 are coupled through respective diodes 158, 160, 162 and 164 to one terminal of a storage capacitor 166, the other terminal of which is grounded. Capacitor 166 is also coupled through a diode 168 to an initializing line 170 which is normally maintained at a low or negative voltage level but is supplied from any suitable source with a high-level pulse to charge the capacitor 166 at the beginning of the prescan period. For example, a switch 169 responsive to entry of an original document into inlet A may actuate a pulse generator 171 to apply the pulse to line 170. Diodes 158 to 164 are oriented to permit current flow from the capacitor 166 to the outputs of the amplifiers 150 to 156. Thus, when photodiode 132, for example scans a highly reflective portion of the document, the potential at the input of amplifier 150 drops to a relatively low value. The output of amplifier 150 assumes the same potential, causing capacitor 166 to discharge through diode 158 until the potential at the capacitor equals that of the output of amplifier 150. On the other hand, when amplifier 150 produces a relatively high output as a dark area is scanned, capacitor 166 cannot recharge to the higher value since diode 158 is in this case reverse-biased. In effect, capacitor 166 stores the lowest-valued potential assumed by any of the amplifiers 150 to 156 during the prescan period. The stored potential in turn indicates the maximum reflectance measured by the photodiodes 132 to 138. Preferably, the discharge current of capacitor 166 is sufficiently limited by the resistance of diodes 158 to 164 and amplifiers 150 to 156 that spurious reflectors on the document surface, such as metal filings, are ignored.

The signal across capacitor 166 contols a circuit which regulates the intensity of the exposure lamp 26 during the exposure period of a copy cycle. I connect a photodiode 174, supported on carriage 30, which senses the intensity of the exposure lamp 26, in series with a resistor 176 between the bias voltage line 140 and ground. The ungrounded terminals of capacitor 166 and resistor 176 provide the normal and inverted inputs, respectively, to a high-gain differential amplifier 172. A driver amplifier 178 coupled to the output of differential amplifier 172 drives the lighting element of exposure lamp 26.

When image exposure takes place after the prescan period, driver amplifier 178 is enabled so that it energizes the exposure lamp 26 in accordance with the output of differential amplifier 172. Since the inverted input to amplifier 172, which represents the lamp intensity as sensed by detector 174, is initally at or near ground potential, driver amplifier at first supplies the lamp 26 with full power. Within a very short time, however, the rising potential across resistor 176 reduces the power supplied to the lamp 26 to a level just sufficient to maintain equilibrium. With the lamp intensity now stabilized and continuously corrected by the negative feedback loop, the lamp 26 is advanced across the imaging platen 22 to expose the surface of the drum 24.

At equilibrium, the potential across resistor 176 is equal to that across capacitor 166 except for a very small correction voltage. The potential across capacitor 166 is in turn equal to the lowest potential developed across any of the photodiodes 132 to 138 during the prescan period. In effect, a balanced bridge condition is established in which the ratio of resistances of photodiode 174 and resistor 176 is equal to the ratio of resistances of resistor 142 and photodiode 132, for example, at maximum reflectance. Since the resistances of each of the diodes 132 and 174 is inversely proportional to the incident light intensity, the balanced bridge condition implies that the product of the intensity of the lamp 26 and the intensity of reflected light from the document as sensed during prescanning is a constant. Background areas are thus reproduced at a predetermined degree of lightness.

Figure 5:
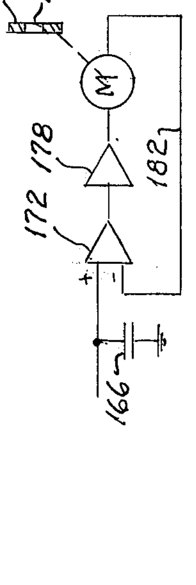
FIG. 5 is a schematic diagram of a modified control circuit which regulates the width of the optical slit.

In FIG. 5 I show an alternative control circuit which regulates the width of the optical slit 42 rather than the intensity of the exposure lamp 26. In this circuit, the power amplifier 178 drives a reversible control motor 180 mechanically coupled to one side of the plate 40. Motor 180 widens the slit 42 in response to a positive input from amplifier 178 and narrows the slit in response to a negative input. Motor 180 also provides a signal on line 182 proportional to the slit width as indicated by the position of the motor. Line 182 is coupled to the inverting input of differential amplifier 172, while the normal amplifier input is coupled to capacitor 166 as before. In operation, amplifier 178 drives the motor 180 in a suitable direction until the inputs to amplifier 172 are equal. The width of the optical slit 42 is thus adjusted to a value proportional to the potential across capacitor 166.

Figure 6:
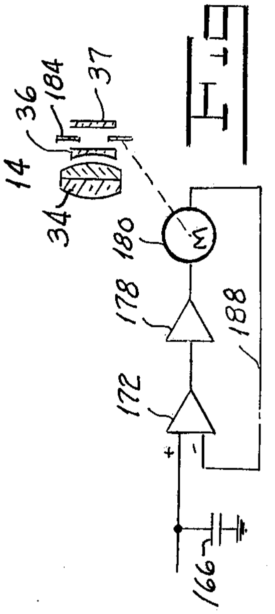
FIG. 6 is a schematic diagram of another modified control circuit which regulates the aperture of a lens diaphragm.

In FIG. 6 I show another alternative control circuit which regulates the aperture of an iris diaphragm 184 placed between the divergent lens 36 and the backing mirror 37. In this circuit, amplifier element 178 drives reversible motor 186, which opens the diaphragm 184 in response to a positive input and closes the diaphragm in response to a negative input. Motor 186 provides a signal on line 188 proportional to the area of the aperture as indicated by the position of the motor. Line 188 drives the inverting input of amplifier 172, the normal input being derived from capacitor 166 as before. In operation, motor 186 adjusts the area of the aperture of the diaphragm 184 to a value proportional to the potential across capacitor 166.

In the circuits shown in FIGS. 5 and 6, the resistances of resistors 142, 144, 146, 148 are preferably made relatively large compared with the resistances of photodiodes 132, 134, 136, 138 at expected levels of illumination to insure that the potential across capacitor 166 varies truly inversely with the maximum measured reflectance. Alternatively, suitable compensation can be provided in the position signals generated on lines 182 and 188.

When the desired number of copies have been made, the gate 116 is actuated to retract the fingers 120 from the transport path to allow the document to separate from the belts 72 at a separation point B. The separated documents are directed by an upwardly curved guide 194 into a stacking tray 196 disposed above the belts 72 and the imaging platen 22. The document is moved along the inner surface of the guide member 194 by a first plurality of drive rollers 198 disposed across the inner surface and by a second plurality of drive rollers 200 disposed across the inner surface at a location spaced downstream from the first plurality of rollers 198. Rollers 198 and 200, which are driven in the direction of sheet movement by any suitable means (not shown), engage first and second pluralities of idler rollers 202 and 204, respectively, mounted opposite the respective rollers 198 and 200 on the other side of the guide member 194. Guide member 194 is formed with slots (not shown) at suitable locations to permit rollers 202 and 204 to contact rollers 198 and 200, respectively.

The stacking tray 196 includes a bottom wall 206 and respective end walls 208 and 210 integrally formed from a single sheet of metal or other material. The bottom wall 206 is formed with one or more depressions 212 to facilitate insertion of the fingers to remove a document. End walls 210 and 208 are respectively mounted along support member 78 and a forwardly disposed support member 213. A protective guide 214 mounted on the end wall 208 prevents the machine operator from inadvertently inserting his fingers into the path of moving parts adjacent to the document guide path.

The stacking tray 196 includes a cover 216 which is preferably formed of a transparent plastic. The rear edge of the cover 216 is pivotally attached to front edge of the ramp 80 by hinges 218 or the like. The front edge of the cover 216 swings downwardly to abut the top of a front panel 220. The cover 208 is formed with a raised central position between its front and rear edges to prevent interference between documents being discharged from the upper end of the guide 194 and upturned edges of documents already in the tray.

While I have shown a system in which background brightness is controlled in the course of the exposure step, it is possible that my reflectance signal may be used to control copy background brightness at another stage of the copying process.

It will be seen that I have accomplished the objects of my invention. My background brightness control automatically produces copies with a white background from originals of various reflectances. My control produces copies of optimum contrast from light originals. By providing true limited-area scanning, my control operates satisfactorily with originals containing continuous-tone material or large amounts of printed matter.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. In a document copier which produces a copy of an original document bearing spaced blocks of printed matter, said copier controlling the brightness of the background areas of said copy in accordance with a control signal, apparatus comprising means for successively measuring the reflectance of the portions of said document lying along a generally linear strip, said measuring means including a photoelectric transducer providing a scanning spot, the size of said spot being less than the spacing between said blocks of printed matter to ensure that at least one of said portions corresponds to a background portion of said document, and means for providing said control signal as a function of the maximum reflectance measured by said measuring means.

2. Apparatus as in claim 1 in which the size of said scanning spot is less than the spacing between said blocks of printed matter.

3. Apparatus as in claim 1 in which the size of said scanning spot is about 1 millimeter.

4. Apparatus as in claim 1 in which the size of said scanning spot is not more than about 1 millimeter.

5. In a document copier which produces a copy of an original document, said copier including regulating means for controlling the brightness of the background areas of said copy in accordance with a control signal, apparatus comprising means for measuring the reflectance of a surface portion of said document, said measuring means comprising a pair of photoelectric transducers operating respectively as a light source and a light sensor, one of said transducers being spaced closely adjacent to said document and being highly directive to permit the measurement of a small spot portion of said document, and transport means for effecting relative linear movement between said document and said transducers to scan a linear strip of said document; and means for providing said control signal as a function of the maximum reflectance measured by said measuring means along said linear strip.

6. Apparatus as in claim 3 in which said copier copies said original document at an imaging station and in which said transport means moves said document along a path to said imaging station, said transducers being disposed at a stationary location along said path.

7. Apparatus as in claim 6 in which said transducers are disposed on one side of said path, said apparatus further comprising a low-reflectance surface disposed on the other side of said path at said location.

8. Apparatus as in claim 6 in which said imaging station includes a transparent imaging platen, said transport means comprising a plurality of parallel-spaced endless conveyor belts extending across said platen, said one transducer arranged at a location between said conveyor belts.

9. Apparatus as in claim 8 in which said apparatus further comprises a low-reflectance surface disposed on the other side of said location from said one transducer.

10. Apparatus as in claim 8 in which said transport means comprises:

- a pulley assembly for supporting said endless belts at one end of said imaging platen; and
- means for moving said document along an arcuate path around said pulley assembly toward said imaging platen, said one transducer being disposed adjacent to said pulley assembly at a location along said arcuate path between said conveyor belts.

11. Apparatus as in claim 10 in which said light sensor senses light from portions of said pulley assembly in the absence of said document, said portions being provided with a low-reflectance surface.

12. Apparatus as in claim 5 which comprises a plurality of light sensors disposed at tranversely spaced locations adjacent to said document.

13. Apparatus as in claim 5 in which one of the edges of said document is aligned relative to said copies, said one transducer being spaced from 2 to 3 inches from said aligned edges.

14. Apparatus as in claim 5 in which said document copier forms an image of the original document on an imaging surface, said regulating means regulating the exposure of said surface to said document image.

15. Apparatus as in claim 14 in which said document is illuminated by an exposure lamp to expose the imaging surface, said regulating means regulating the intensity of said exposure lamp.

16. Apparatus as in claim 14 in which a member having an optical slit of adjustable width is disposed in the optical path between the document and the imaging surface, said regulating means regulate the width of said optical slit.

17. Apparatus as in claim 14 in which a lens having an adjustable diaphragm is disposed in the original path between the document and the imaging surface, said regulating means regulating the aperture of said diaphragm.

18. Apparatus as in claim 5 in which the transducer operating as a light source is highly directive and spaced closely adjacent to said document.

19. In a document copier which produces a copy of an original document bearing spaced blocks of printed matter, said copier controlling the brightness of the background areas of said copy in accordance with a control signal, apparatus comprising means for successively measuring the reflectance of the portions of said document lying along a generally linear strip, the width of said strip being less than the spacing between said blocks of printed matter, and means for providing said control signal as a function of the maximum reflectance measured by said measuring means, said measuring means comprising a pair of photoelectric transducers operating respectively as a light source and a light sensor, one of said transducers being spaced closely adjacent to said document and being highly directive to permit the measurement of a small spot portion of said document, and transport means for effecting relative linear movement between said document and said transducer to scan a linear strip of said document.

20. Apparatus as in claim 19 in which said copier copies said original document at an imaging station and in which said transport means moves said document along a path to said imaging station, said transducers being disposed at a stationary location along said path.

21. Apparatus as in claim 20 in which the transducer operating as a light source is highly directive and spaced closely adjacent to said document.

22. In a document copier which produces a copy of an original document, said copier controlling the brightness of the background areas of said copy in accordance with a control-signal, apparatus comprising means for successively measuring the reflectance of the portions of said document lying along a generally linear strip, the width of said strip being not more than about 1 millimeter, and means for providing said control signal as a function of the maximum reflectance measured by said measuring means, said measuring means comprising a pair of photoelectric transducers operating respectively as a light source and a light sensor, one of said transducers being spaced closely adjacent to said document and being highly directive to permit the measurement of a small spot portion of said document, and transport means for effecting relative linear movement between said document and said transducer to scan a linear strip of said document.

23. Apparatus as in claim 22 in which said copier copies said original document at an imaging station and in which said transport means moves said document along a path to said imaging station, said transducers being disposed at a stationary location along said path.

24. Apparatus as in claim 22 in which the transducer operating as a light source is highly directive and spaced closely adjacent to said document.

* * * * *

UNITED STATES PATENT AND TRADEMARK OFFICE

CERTIFICATE OF CORRECTION

PATENT NO. : 4,124,295

DATED : November 7, 1978

INVENTOR(S) : Kenneth W. Gardiner

It is certified that error appears in the above-identified patent and that said Letters Patent are hereby corrected as shown below:

Column 9, line 22, "claim 3" should read -- claim 5;

Column 10, line 4, "regulate" should read -- regulating --.

Signed and Sealed this

*Twentieth* Day of *February 1979*

[SEAL]

*Attest:*

RUTH C. MASON
*Attesting Officer*

DONALD W. BANNER
*Commissioner of Patents and Trademarks*